Patented Dec. 15, 1953

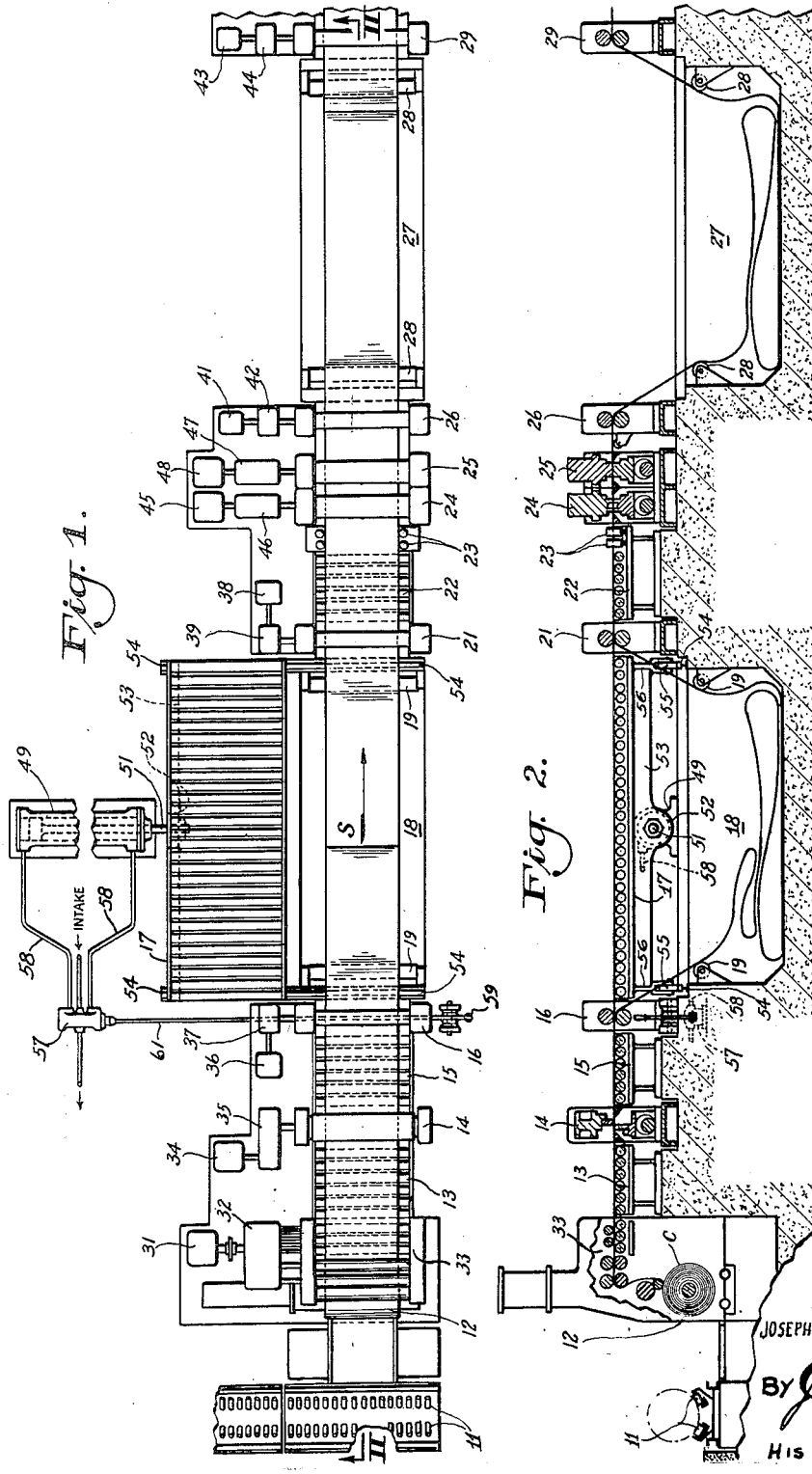

2,662,271

UNITED STATES PATENT OFFICE 2,662,271

METHOD OF JOINING SECTIONS OF STRIP FOR A UNIFORM-SPEED CONTINUOUS-FEED STRIP-TREATING LINE

Joseph I. Greenberger, Pittsburgh, Pa., assignor to United Engineering & Foundry Company, Pittsburgh, Pa., a corporation of Pennsylvania Application March 27, 1948, Serial No. 17,526

2 Claims. (Cl. 29—148)

This invention relates to the method of and apparatus for the handling, joining together, and storing of successive strips of material in continuous processing lines in order to insure that adequate material will be available for keeping the processing portion of the line in continuous operation during the interval within which additional coils of material are introduced into the line and joined to preceding strips passing therethrough.

By reason of the necessity for intermittently interrupting the steady flow of strip material passing through processing apparatus which, for example, may include a pickling or a plating operation, for connecting together successive strips of uncoiled material, non-uniform processing of the strip as well as a decrease in the production of the line will result. In the uncoiling of strip material for continuous processing, particularly in pickling lines, it is necessary to provide adequate uncoiling units which, due to the amount of cold working involved in uncoiling and straightening the strip prior to passage through the line are quite elaborate and expensive to install. Simple uncoilers are not, as a rule, sufficient for the purpose since coil breaks will result if proper care is not exercised in unwrapping each coil as it is added to the line and therefore elaborate uncoiling means are provided which involve an appreciable time for loading new coils, especially if the coils have been damaged in the handling thereof subsequent to the hot rolling operation. In addition to this delay, a considerable loss of time results when the strip ends are sheared and inspected prior to the actual strip end welding operation. Where the features of this invention are not employed in a strip processing line, it is necessary either to slow down or interrupt entirely the movement of the strip through the processing portion of the line during the interval required for introducing additional material therein and joining the leading end thereof to the trailing end of the strip material immediately preceding. Included among the objects of this invention, therefore, is to provide apparatus for facilitating the storage and the feeding, at a constant speed, of strip material through continuous processing lines; to provide for the dressing and the welding together of the trailing end of one strip to the leading end of the next adjacent strip without interfering with the efficiency of the line; to provide in a processing line an arrangement whereby the minimum of equipment is required to insure continuity and uniformity of operation of the processing portion of the line; and, to provide a method whereby handling and joining together successively of a plurality of coils of strip material may be expeditiously and efficiently accomplished and the strip processed without interrupting the continuity and operation of the processing line.

The foregoing objects, as well as the various other novel features and advantages of this invention, will become apparent from the following specification and accompanying drawings of which:

Figure 1 is a plan view of a portion of a metal strip processing line in which the features of the invention herein disclosed are embodied, and Figure 2 is a sectional elevation view taken on line II—II of Figure 1.

With reference to the drawings, Figures 1 and 2, the apparatus as illustrated therein comprises a coil handling gravity conveyor 11, a processing uncoiler 12 adjacent thereto, a conveyor 13, an up-cut shear 14, a conveyor table 15, a pinch roll unit 16, a transversely movable conveyor table 17, a looping pit 18 having guide and deflector rollers 19 mounted at the entry and delivery ends thereof, a second pinch roll unit 21, a conveyor 22 having vertical guide rollers 23 mounted thereon adjacent to a flash welder 24, a stitcher 25, a third pinch roll unit 26, a looping pit 27 having guide and deflector rolls 28 secured to the entry and delivery ends thereof and a fourth pinch roll unit 29. Although not specifically shown herein since it forms no part of this invention, following the last-mentioned pinch roll unit there would be included equipment such as is usually employed in strip processing lines which, though not limited thereto, may include, for example, a plating or a pickling operation.

For each of the separate units in the line which require a source of power for the operation thereof, suitable motors, with adequate control switches connected electrically to a source of power, not shown, are provided. An electrical motor 31, is connected through a gear box 32 to the pinch roll and strip leveler portion 33 of the uncoiler 12. The up-cut strip end dressing shear 14 is driven by the electrical motor 34 connected thereto through a gear reduction unit 35. The driving means for the pinch roll units include a motor 36 with a reducer 37 for unit 16, a motor 38 with a reducer 39 for unit 21, a motor 41 with a reducer 42 for unit 26, and a motor 43 with a reducer 44 for unit 29. Although the strip end joining means may be actuated and controlled hydraulically, the flash welder 24 is operated by a motor 45 through a gear box 46, and the stitcher 25 through a gear box 47 by means of a motor 48.

The transversely movable conveyor section 17 is operable by means of a reversible hydraulic motor 49 of which the piston rod 51 is connected at its outer end to a boss 52 extending downward from and secured to the side rail 53 of the conveyor section 17. A pair of tracks 54 extending transversely of and anchored to the ends of the pit 18 are engaged by wheels 55 rotatably secured to the end members 56 of the conveyor 17. A suitable reversing valve 57 is connected to the hydraulic motor 49 through pipes 58 and to a source of hydraulic power as shown. Although the valve 57 is disclosed as being operated by means of a hand lever 59 through a rod 61 attached at one end to the lever 59 and at the other end to the valve 57, a remote control system may be utilized for actuating the valve by means of a solenoid or the like.

In the threading of the processing line and subsequent uncoiling of additional coils of strip material, the transversely movable conveyor 17 is of considerable aid. When the leading end of the first coil being unwrapped is squared off in the up-cut shear 14, the strip is passed through the pinch roll unit 16, over the conveyor 17 which temporarily bridges the looping pit 18, through the pinch roll unit 21, welder 24, stitcher 25, pinch roll unit 26 and finally through pinch roll unit 29 from where it is threaded into the processing baths which follow. As soon as the strip begins to travel through the processing apparatus at the uniform desired speed required therefor and the uncoiling thereof quickly completed, the trailing end is squared off in the shear 14, and the forward motion thereof interrupted in either the welder 24 or the stitcher 25 depending upon in which unit the joining operation is to be performed. Excess material of the first coil which will be available for processing through the line is accumulated in the looping pit 27. A second coil is then placed in the uncoiler 12, the leading end thereof squared in the shear 14 and quickly fed through the pinch roll unit 16, over conveyor 17 to by-pass pit 18, through pinch roll unit 21, and brought up to the trailing end of the first strip and joined thereto. As soon as the leading end of the second strip has passed over the pit 18 and between the rolls of the pinch roll unit 21, the conveyor section 17 is rapidly withdrawn to its transversely inactive position, thereby permitting excess strip material of the second coil to be accumulated in the first looping pit 18. To avoid injury to that portion of the strip which has been gathered in the pit 18 as well as to the sheared trailing end thereof, movement of the trailing end of the second strip can be interrupted just prior to its entry into the pinch roll unit 16 and maintained there until all of the material within pit 18 has been withdrawn therefrom and accumulated in the second looping pit 27, whereupon the trailing end is permitted either to pass over the removable conveyor which may be replaced into its looping pit bypass position or through the looping pit 18 and through pinch roll unit 21, the movement thereof being interrupted in the desired means provided for joining the strip ends together. A third coil can then be placed in the uncoiler 12, the leading end thereof squared in the shear 14 and, since the conveyor section 17 is quickly positioned over pit 18 as soon as the trailing end of the previous strip has been withdrawn therefrom, passed through pinch roll unit 16, over conveyor section 17 to by-pass pit 18 and through pinch roll unit 21. Forward movement thereof is interrupted at a point coinciding with that of the trailing end of the previous strip where joining of the two strip ends is effected as in the previous case. As soon as the leading end of the third coil has passed through pinch roll unit 21, conveyor section 17 is withdrawn transversely to its inactive position. Excess material of the third coil is then permitted to gather in the looping pit 18, the trailing end being squared in the shear 14 and forward movement interrupted just prior to the entry thereof between the rolls of pinch roll unit 16. Succeeding coils, then, are handled in accordance with the foregoing procedure so that any desired number of coiled strips can be processed rapidly in a continuous manner.

Since the looping pit 18 is interposed between the up-cut shear 14 and the strip end joining means comprising welder 24 and stitcher 25, and, further, that the looping pit 27 is adjacent to the processing tanks and at the exit side of the strip end joining means, considerable saving in time as well as an increase in production can be effected inasmuch as the welding or stitching operation is carried out independently of the shearing operation and, at times, even simultaneously therewith thus making the slowest of these operations the limiting factor in establishing the maximum processing line speeds.

In accordance with the provisions of the patent statutes, I have explained the principle and operation of my invention and have illustrated and described what I consider to represent the best embodiment thereof. However, I desire to have it understood that within the scope of the appended claims the invention may be practiced otherwise than as specifically illustrated and described.

I claim:

1. In the method of providing continuous strip material for passage through the conditioning portion of a processing line at a uniform rate of speed within which there are included in sequence a strip end trimming means, a strip accumulating zone, a removable zone by-pass strip conveyer adjacent said zone, strip end joining means and a second strip accumulating zone, the steps comprising supporting a coil of strip material and uncoiling the strip therefrom at a speed in excess of the uniform speed at which the strip is processed, by-passing said first strip accumulating zone and gathering said strip at the second-mentioned zone for withdrawal therefrom at a uniform rate of speed for processing, trimming the trailing end of the strip, interrupting movement of the trailing end of the strip at the strip end joining means, supporting a second coil of strip material and uncoiling a portion thereof, trimming the leading end of the strip, by-passing said first-mentioned zone with and interrupting movement of the leading end at a point adjacent to the trailing end of the preceding strip, joining the ends of the strips together while simultaneously uncoiling the remainder of said second coil and feeding substantially all of the strip thereof at a speed in excess of said strip processing speed into said first-mentioned zone, trimming the trailing end therefrom and then accumulating the joined strips at said second zone at a speed in excess of said strip processing speed, and interrupting movement of the trailing end thereof at the strip end joining means for joining to the trimmed leading end of a strip subsequently introduced into said line.

2. In the method of providing continuous strip material for passage through the conditioning portion of a strip processing line at a uniform rate of speed within which there are included in sequence a strip end trimming means, a strip accumulating zone, a removable zone by-pass strip guide adjacent said zone, strip end joining means and a second strip accumulating zone, the steps comprising trimming the trailing end of strip material previously uncoiled and introduced into said line and interrupting movement thereof at the strip end joining means, uncoiling a portion of another coil of strip material, trimming the leading end thereof, continuing the uncoiling of said coil and by-passing said first-mentioned zone with and interrupting movement of the leading end thereof at a point adjacent to the trailing end of the preceding strip for joining thereto, joining the ends of the strips together while simultaneously uncoiling the remainder of said coil and feeding substantially all of the strip thereof at a speed in excess of said processing speed into said first-mentioned zone, trimming the trailing end therefrom and accumulating the joined strips at said second zone at a speed in excess of said strip processing speed and interrupting movement of the trimmed trailing end thereof at the strip end joining means for joining to the trimmed leading end of a strip subsequently introduced into said line.

JOSEPH I. GREENBERGER.

References Cited in the file of this patent

UNITED STATES PATENTS

| Number | Name | Date |
|---|---|---|
| 1,175,236 | Cary | Mar. 14, 1916 |
| 2,078,365 | Biggert | Apr. 27, 1937 |
| 2,183,159 | Chesley | Dec. 12, 1939 |
| 2,196,600 | Wean | Apr. 9, 1940 |
| 2,219,049 | McArthur | Oct. 22, 1940 |
| 2,204,984 | Fenton | June 18, 1940 |
| 2,238,667 | Wales | Apr. 15, 1941 |
| 2,265,052 | Anderson | Dec. 2, 1941 |
| 2,509,304 | Klein | May 30, 1950 |